United States Patent [19]

Rexine

[11] 4,269,428
[45] May 26, 1981

[54] HIDEAWAY TOW HITCH

[76] Inventor: Carl A. Rexine, General Delivery, Bowden, N. Dak. 58418

[21] Appl. No.: 84,864

[22] Filed: Oct. 15, 1979

[51] Int. Cl.³ ............................................. B60D 1/14
[52] U.S. Cl. ........................... 280/491 R; 280/478 A; 280/482
[58] Field of Search ........... 280/491 R, 491 A, 491 B, 280/478 R, 478 A, 478 B, 481, 482

[56] References Cited

U.S. PATENT DOCUMENTS

| 2,779,620 | 1/1957 | Reed | 280/491 R |
| 2,880,016 | 3/1959 | Petersen | 280/482 |
| 2,896,969 | 7/1959 | Carty | 280/491 A |
| 2,914,343 | 11/1959 | Roth | 280/491 A |
| 3,572,764 | 3/1971 | Rubin | 280/491 A |

FOREIGN PATENT DOCUMENTS 1405258  9/1975  United Kingdom ............... 280/478 A

*Primary Examiner*—John J. Love
*Assistant Examiner*—Donn McGiehan
*Attorney, Agent, or Firm*—Daniel Jay Tick

[57] ABSTRACT

A towing device releasably couples a towing vehicle to a towed vehicle and is movably mounted on the chassis beneath the grill guard of the towed vehicle. In a tow position, the towing device extends beyond the grill guard and the towed vehicle. In a retracted position, the towing device is unnoticeable.

6 Claims, 6 Drawing Figures

HIDEAWAY TOW HITCH

BACKGROUND OF THE INVENTION

The present invention relates to a hideaway tow hitch. More particularly, the invention relates to a hideaway tow hitch for a principal vehicle having a chassis, a grill and a grill guard mounted on the vehicle and extending substantially adjacent the grill.

The principal object of the invention is to provide a hideaway tow hitch of simple structure, which is inexpensive in manufacture and mountable, with facility and convenience, on most ssuitable vehicles.

An object of the invention is to provide a hideaway tow hitch of simple structure, which is neat in appearance and is not noticeable when it is in its retracted position.

Another object of the invention is to provide a hideaway tow hitch which is used with facility, convenience and rapidity by anyone, skilled or unskilled, and is self-aligning and automatically lockable in position.

Still another object of the invention is to provide a hideaway tow hitch of simple structure, which is inexpensive in manufacture, used with facility and convenience, and functions efficiently, effectively and reliably to permit the vehicle to which it is affixed to be towed in a proper manner, and is unnoticeable when in its retracted position.

BRIEF SUMMARY OF THE INVENTION

In accordance with the invention, a hideaway tow hitch for a principal vehicle having a length, a chassis, a grill and a grill guard mounted on the vehicle and extending substantially adjacent the grill, comprises a towing device for releasably coupling a towing vehicle to the principal vehicle. A mounting device movably mounts the towing device on the chassis beneath the grill guard of the principal vehicle in a manner whereby in a tow position the towing device extends beyond the grill guard and the principal vehicle and in a retracted position the towing device is behind the grill guard and is substantially unnoticeable.

The mounting device slidably mounts the towing device on and under the chassis in a manner whereby in the retracted position the towing device is withdrawn beneath the chassis.

The mounting device comprises a pair of spaced parallel guide bars affixed in substantially horizontal position to the chassis and beneath the grill guard. A slide bar extends transverse to the guide bars and is slidably mounted thereon for free movement in directions of length of the vehicle and in a range of angles relative to the guide bars. The towing device is affixed to the slide bar.

A pair of latching devices are pivotally affixed to the bottom of the grill guard for selectively permitting the slide bar to move freely along the guide bars and selectively preventing said slide bar from moving freely along the guide bars thereby locking the slide bar in position. A latch control is coupled to the latching devices and is manually controllable to move the latching devices individually to selected positions permitting slide bar movement and preventing slide bar movement.

pivotal coupling devices pivotally affix the towing device to the slide bar for movement in directions vertical to the plane of the guide bars.

Each of the guide bars has a first end affixed to the chassis and a spaced opposite second end adjacent the grill guard. The grill guard has lower sections which prevent removal of the towing device or tow hitch from the guide bars. Additional stop members on the ends of the guide bars closer to the rear of the vehicle than to the front thereof, prevent the removal of the tow hitch from said guide bars, rearward, when said tow hitch is retracted.

The towing device includes a tow bar having a fixedly mounted base part and a retractable tow part telescopically mounted in the base part for selectively securable movement therein in axial directions whereby the tow bar is selectively adjustable in length.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
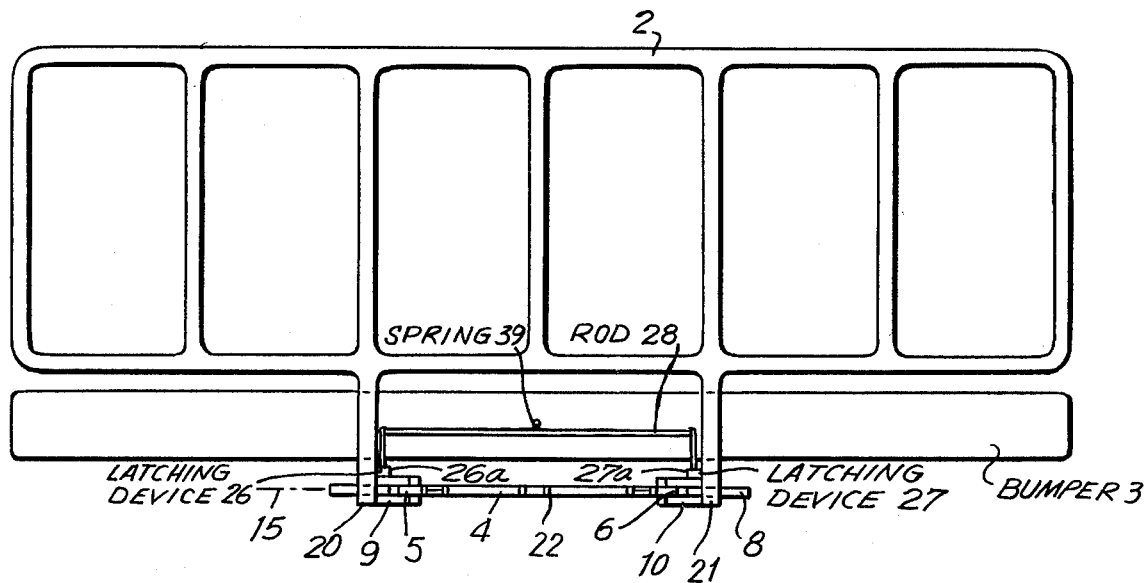
FIG. 1 is a front view of an embodiment of the hideaway tow hitch of the invention, in its retracted position.
Figure 2:
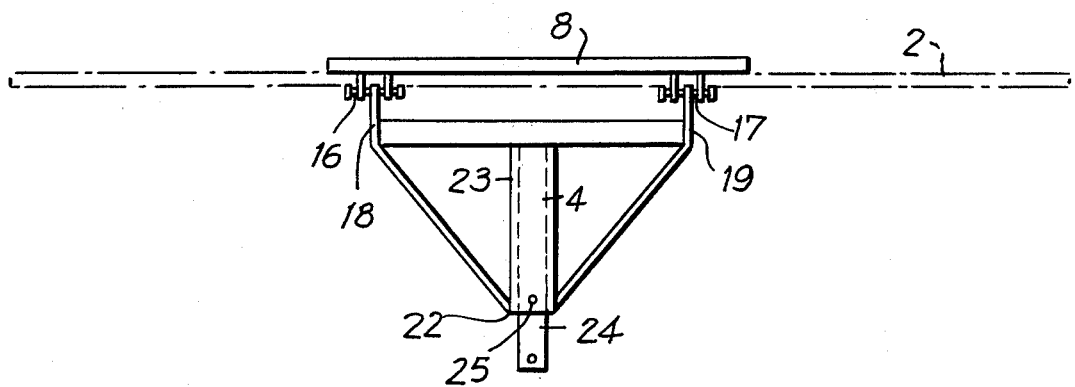
FIG. 2 is a top view, on an enlarged scale, of the embodiment of FIG. 1, in its extended position.

The hideaway tow hitch of the invention is for a principal vehicle, or vehicle to be towed, having a length (not shown in the FIGS.) from its front end to its rear end, a chassis 1 (FIG. 3), a grill (not shown in the FIGS.) and a grill guard 2 mounted on the vehicle and extending substantially adjacent the grill (FIGS. 1 and 2). The grill guard 2 extends over the front bumper 3 of the principal vehicle (FIG. 1).

The hideaway tow hitch of the invention comprises a towing device 4 (FIGS. 1 to 3) for releasably coupling a towing vehicle to a principal vehicle.

Figure 3:
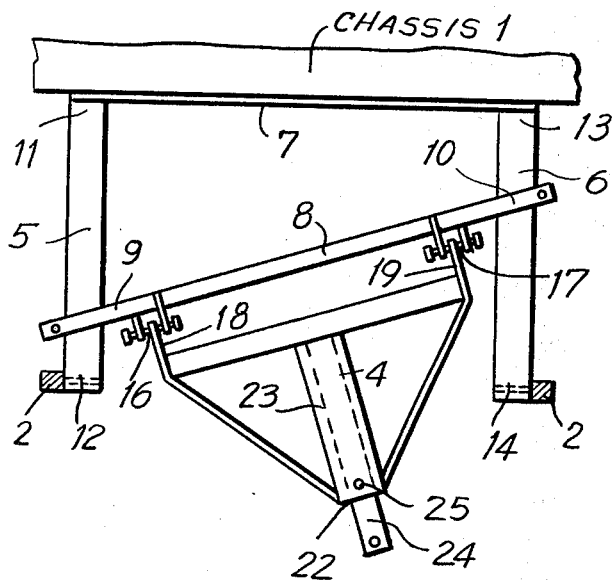
FIG. 3 is a top view of the embodiment of FIG. 1 in its extended position and self-positioned at an angle with the guide bars.

A mounting device movably mounts the towing device 4 on the chassis 1 beneath the grill guard 2 of said principal vehicle in a manner whereby in a tow position, shown in FIGS. 2 and 3, said towing device extends beyond said grill guard and said principal vehicle, and in a retracted position, shown in FIG. 1, said towing device is behind said grill guard and is substantially unnoticeable. The mounting device slidably mounts the towing device 4 on and under the chassis 1 in a manner whereby in the retracted position, said towing device is withdrawn beneath said chassis.

The mounting device comprises a pair of spaced parallel guide bars 5 and 6 (FIGS. 1, 3 and 4) affixed in substantially horizontal position to the chassis 1, as shown in FIG. 3, and beneath the grill guard 2, as shown in FIG. 1. The guide bars 5 and 6 are affixed to the chassis 1 by any suitable means such as, for example, an elongated angle iron 7 (FIG. 3).

A slide bar 8 (FIGS. 1 to 4) extends transverse to the guide bars 5 and 6, as shown in FIGS. 1 and 3, and is slidably mounted thereon for free movement in directions of length of the vehicle and in a range of angles relative to said guide bars, as shown in FIG. 3. The range of angles may be from 45° to 90° between the slide bar 8 and the guide bars 5 and 6. The slidable mounting of the slide bar 8 on the guide bars 5 and 6 for free movement in directions of length of the guide bars and in a range of angles relative to the guide bars is accomplished by bifurcated spaced opposite ends 9 and 10, respectively (FIGS. 1 and 4), of said slide bar. Each of the bifurcated ends 9 and 10 of the slide bar 8 extends substantially parallel to said slide bar and to the guide bars 5 and 6 (FIGS. 1 and 4).

Figure 4:
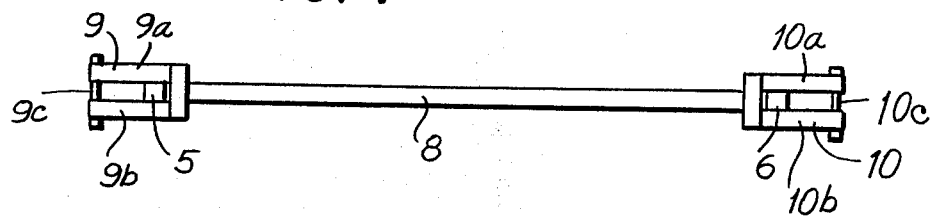
FIG. 4 is a front view, partly in section, of part of the embodiment of FIG. 1.

The bifurcated end 9 has a pair of parallel members 9a and 9b spaced from each other a distance slightly greater than the thickness of the slide bar 8, as shown in FIG. 4. A pin 9c extending perpendicularly between the members 9a and 9b is spaced from the guide bar 5 (FIG. 4) and retains the slide bar 8 on said guide bar and permits free movement of said slide bar on said guide bar. The bifurcated end 10 has a pair of parallel members 10a and 10b spaced from each other a distance slightly greater than the thickness of the slide bar 8, as shown in FIG. 4. A pin 10c extending perpendicularly between the members 10a and 10b is spaced from the guide bar 6 (FIG. 4) and retains the slide bar 8 on said guide bar and permits free movement of said slide bar on said guide bar.

None of the members 9a, 9b, 10a, 10b, or the guide bars 5 and 6 are shown in the view of FIG. 2, in order to enhance the clarity of illustration.

The guide bar 5 has a first end 11 affixed to the chassis 1 of the principal vehicle and a spaced opposite second end 12 adjacent the grill guard 2, as shown in FIG. 3. The guide bar 6 has a first end 13 affixed to the chassis 1 of the principal vehicle and a spaced opposite second end 14 adjacent the grill guard 2, as shown in FIG. 3.

The towing device 4 is pivotally affixed to the slide bar 8, as shown in FIGS. 1 to 3, for movement of said towing device in directions vertical to the plane 15 (FIG. 1) of the guide bars 5 and 6. This is accomplished by a pair of pivot pins 16 and 17 extending through a pair of end arms 18 and 19, respectively, of the towing device 4, as shown in FIGS. 2 and 3. The pivot pins 16 and 17 are mounted on the slide bar 8 in mutually spaced parallel relation (FIGS. 2 and 3) with each of said pivot pins in spaced parallel relation with said slide bar.

The grill guard 2 has lower sections 20 and 21 (FIG. 1), which function as stops to prevent the tow hitch from slipping off the guide bars 5 and 6.

The towing device 4 includes a tow bar 22 (FIGS. 1 to 3) having a fixedly mounted base part 23 (FIGS. 2 and 3). The towing device 4 has a retractable tow part 24 (FIGS. 2 and 3) telescopically mounted in the base part 23 for selectively securable movement in said base part in axial directions. The tow bar 22 is thus selectively adjustable in length. This is accomplished by forming a hole 25 through the base part 23 (FIGS. 2 and 3) and a plurality of spaced linearly extending holes through the tow part 24. When the tow part 24 is manually extended to a desired length, a pin (not shown in the FIGS.) is inserted through the hole 25 of the base part 23 and the appropriate hole of the tow part 24.

A pair of latching devices 26 and 27 are pivotally affixed to the grill guard 2 via pivot pins 26a and 27a, respectively (FIG. 1), for selectively permitting the slide bar 8 to move freely along sthe guide bars 5 and 6, when desired. The latching devices 26 and 27 also selectively prevent the slide bar 8 from moving freely along the guide bars 5 and 6, thereby when desired, locking said slide bar in position. A latch control rod 28 (FIGS. 1 and 5) is coupled to the latching devices 26 and 27 and is manually controllable to move said latching devices individually to selected positions for selectively permitting slide bar movement and preventing slide bar movement. When the latch control rod 28 is pulled, out from the front of the vehicle, the latching devices 26 and 27 are positioned to release the tow hitch so that it may be retracted and automatically locked in its extended position.

Figure 5:
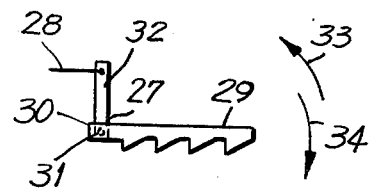
FIG. 5 is a view, on an enlarged scale, of an embodiment of a latching device of the hideaway tow hitch of the invention.

The latching device 27 is shown in detail in FIG. 5. In the embodiment of FIG. 5, the latching device 27 comprises a toothed member 29 pivotally affixed, at one end 30 of said member, to the bottom of the grill guard 2 via a pivot pin 31. The control rod 28, which is a rod, is coupled to the end 30 of the toothed member 29 via a coupling pin 32 extending from said end of said member substantially perpendicularly thereto. Thus, when the control rod 28 is manually pulled forward from the front of the vehicle, it rotates the toothed member 29 counterclockwise about the pivot pin 31, as indicated by an arrow 33 in FIG. 5. This frees the slide bar 8 for movement along the guide bar 6. When the latching device 27 is in its position shown in FIG. 5, due to the control rod 28 not being pulled forward, it automatically locks the slide bar 8 to the guide bar 6, as soon as said slide bar passes under said latching device. This prevents movement of the slide bar 8 along the guide bar 6.

The latching device 26 is identical to the latching device 27 and functions in the identical manner in cooperation with the guide bar 5 and control rod 28.

Figure 6:
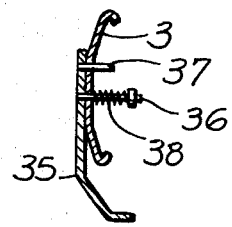
FIG. 6 is a cross-sectional view, on an enlarged scale, of an embodiment of a holding latch for the tow hitch of the invention.

The holding latch of FIG. 6 is utilized to retain the tow hitch in its retracted position and comprises a retention bracket 35 affixed to the front surface of the bumper 3 via a pair of pins 36 and 37. The pin 37 is in the area of the upper part of the bracket 35 and the pin 36 is at about the center of the bumper, beneath the pin 37. A spring 38 (FIG. 6) is mounted on the pin 36. The holding latch functions to hold up the front section of the tow hitch when said tow hitch is in its retracted position.

A fhield (not shown in the FIGS.) may be releasably affixed to the grill guard 2 to cover the tow hitch in its retracted position, and functions as a secondary lock for said tow hitch in said retracted position.

A spring 39 is affixed to the bumper 3 at one end and to the control rod 28 at its other end (FIG. 1). The spring 39 applies pressure on the latching devices 26 and 27 to keep them in their locked positions.

While the invention has been described by means of a specific example and in a specific embodiment, I do not wish to be limited thereto, for obvious modifications will occur to those skilled in the art without departing from the spirit and scope of the invention.

I claim:

1. A hideaway tow hitch for a principal vehicle having a length, a chassis, a grill and a grill guard mounted on the vehicle and extending substantially adjacent the grill, said hideaway tow hitch comprising a towing device for releasably coupling a towing vehicle to said principal vehicle; and mounting means including a pair of spaced parallel guide bars affixed in substantially horizontal position to said chassis for movably mounting said towing device on the chassis beneath the grill guard of said principal vehicle in a manner whereby in a tow position said towing device extends beyond said grill guard and said principal vehicle and in a retracted position said towing device is behind said grill guard and is substantially unnoticeable, said towing device being freely movable in directions of length of said vehicle and in a range of angles relative to said guide bars.

2. A hideaway tow hitch for a principal vehicle having a length, a chassis, a grill and a grill guard mounted on the vehicle and extending substantially adjacent the grill, said hideaway tow hitch comprising a towing device for releasably coupling a towing vehicle to said principal vehicle;

mounting means for movably mounting said towing device on the chassis beneath the grill guard of said principal vehicle in a manner whereby in a tow position said towing device extends beyond said grill guard and said principal vehicle and in a retracted position said towing device is behind said grill guard and is substantially unnoticeable, said mounting means comprising a pair of spaced parallel guide bars affixed in substantially horizontal position to said chassis and beneath said grill guard; and a slide bar extending transverse to said guide bars and slidably mounted thereon for free movement in directions of length of said vehicle and in a range of angles relative to said guide bars, said towing device being affixed to said slide bar.

3. A hideaway tow hitch as claimed in claim 2, further comprising a pair of latching devices pivotally affixed to the bottom of said grill guard for selectively permitting said slide bar to move freely along the guide bars and selectively preventing said slide bar from moving freely along said guide bars thereby locking said slide bar in position and latch control means coupled to said latching devices and manually controllable to move said latching devices individually to selected positions for selectively permitting slide bar movement and preventing slide bar movement.

4. A hideaway tow hitch as claimed in claim 2, further comprising pivotal coupling means for pivotally affixing said towing device to said slide bar for movement in directions vertical to the plane of said guide bars.

5. A hideaway tow hitch as claimed in claim 2, wherein each of said guide bars has a first end affixed to said chassis and a spaced opposite second end adjacent said grill guard, and wherein said grill guard has lower sections for preventing removal of said towing device from said guide bars.

6. A hideaway tow hitch as claimed in claim 2, wherein said towing device includes a tow bar having a fixedly mounted base part and a retractable tow part telescopically mounted in said base part for selectively securable movement therein in axial directions whereby said tow bar is selectively adjustable in length.

* * * * *